April 20, 1965    R. P. VINCENT    3,179,168
METALLIC CASING LINER
Filed Aug. 9, 1962    8 Sheets-Sheet 1

*INVENTOR.*
RENIC P. VINCENT

April 20, 1965  R. P. VINCENT  3,179,168
METALLIC CASING LINER

Filed Aug. 9, 1962  8 Sheets-Sheet 2

INVENTOR.
RENIC P. VINCENT

April 20, 1965   R. P. VINCENT   3,179,168
METALLIC CASING LINER
Filed Aug. 9, 1962   8 Sheets-Sheet 3

*INVENTOR.*
RENIC P. VINCENT

April 20, 1965   R. P. VINCENT   3,179,168
METALLIC CASING LINER

Filed Aug. 9, 1962   8 Sheets-Sheet 5

INVENTOR.
RENIC P. VINCENT
BY *Buell B. Hamilton*
ATTORNEY

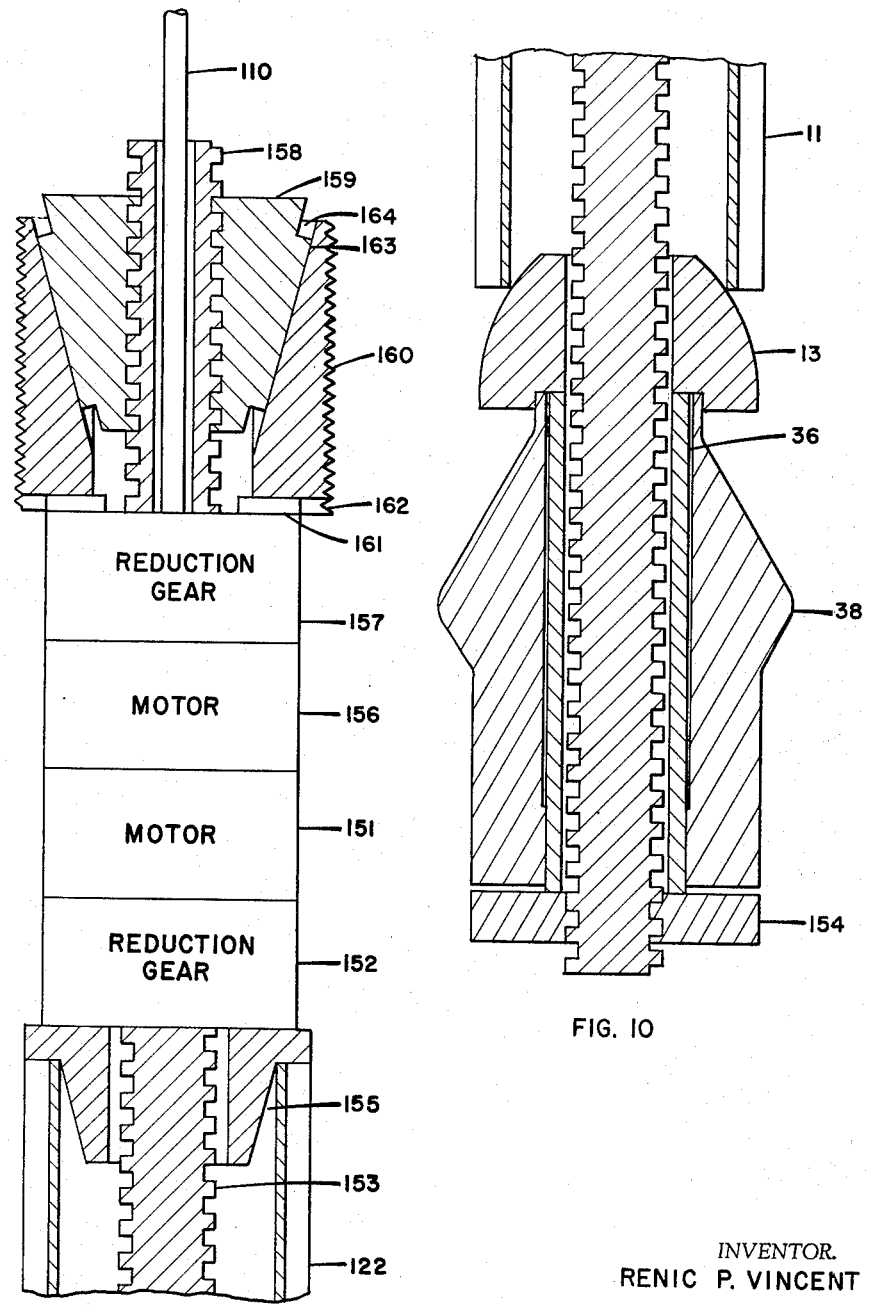

April 20, 1965 R. P. VINCENT 3,179,168
METALLIC CASING LINER
Filed Aug. 9, 1962 8 Sheets-Sheet 7

INVENTOR.
RENIC P. VINCENT
BY
ATTORNEY 3,179,168
METALLIC CASING LINER
Renic P. Vincent, Tulsa, Okla., assignor to Pan American Petroleum Corporation, Tulsa, Okla., a corporation of Delaware
Filed Aug. 9, 1962, Ser. No. 216,949
6 Claims. (Cl. 166—14)

This invention relates to setting a metallic liner inside casing in a well. More particularly, it relates to a method for performing such an operation in which a good seal is formed and maintained between the casing and liner. This is a continuation-in-part of my U.S. patent application Serial Number 123,039, filed July 10, 1961, now abandoned.

A principal use for liners in wells is to avoid the necessity for running an entire string of smaller casing in a well which already has a larger string of casing. Possibly the most common use is in the bottom of the well where the existing casing does not extend to the bottom of the well. In this use, a short liner lowered through the casing into the bottom of the well where a seal is formed between the liner and casing to provide a metallic liner in the well to substantially its full depth. In such cases a seal between the liner and casing is generally provided by Portland cement pumped in back of the liner to fill the space between the liner and casing. Such seals are seldom perfect. As a result, if the pressure of fluids from the formations penetrated by the well is applied to the outside of the liner and casing, a leak usually results.

The liner is rarely as thick or strong as the casing. When pressure is applied outside the liner and casing, the liner is compressed more than the casing and a crack forms between them even if none existed before. As soon as an opening is formed for entrance of fluids between the casing and liner, the pressures inside and outside the casing tend to become balanced, permitting the casing to return to its unstressed condition. This further widens the opening between the casing and liner. Since the wider the opening, the more the casing stress is relieved and since the more this stress is relieved, the wider the opening becomes, it is apparent that a leak between the casing and liner can hardly be avoided even though a long overlap of casing and liner is provided.

This problem is particularly acute if it is desired to place a steel liner or patching steel sleeve over parted casing or a split or hole in casing. In this case, it is difficult to place Portland cement between the casing and liner and hold the cement in place until it sets. In addition, the application of pressure outside the liner quickly causes leakage in the manner just described.

With these problems in mind, an object of this invention is to provide a method for setting a metallic liner inside well casing or other cylindrical metallic vessels, so that a seal is established and maintained between the liner and casing even when pressure is applied outside the liner, as through a hole in the casing. Other objects will be apparent to those skilled in the art from the following drawing, description and claims.

In general, I accomplish the objects of my invention by using a vertically corrugated metal liner. The external cross-sectional perimeter of this corrugated liner is greater than the internal cross-sectional circumference of the casing, but the maximum external cross-sectional dimension of the corrugated liner is less than the internal diameter of the casing so the liner can be inserted into the casing. A mat of glass fibers, preferably woven glass cloth, is placed around the corrugated liner and this mat is saturated with a settable liquid resin, such as epoxy resin, before the liner is placed inside the casing. After the liner is placed at the desired location in the casing, an expanding tool is run through the corrugated liner to cause it to assume a cylindrical shape inside the casing. The liner is thus left in substantially maximum compressive stress, which is an essential aspect of my method.

In the drawing,

FIGURE 9 is a view partly in cross-section of the upper part of an apparatus employing jack screws driven by motors to set slips and expand the liner into contact with the casing;

FIGURE 10 is a cross-sectional view of the lower part of the apparatus, the top part of which is shown in FIGURE 9;

Figure 1:
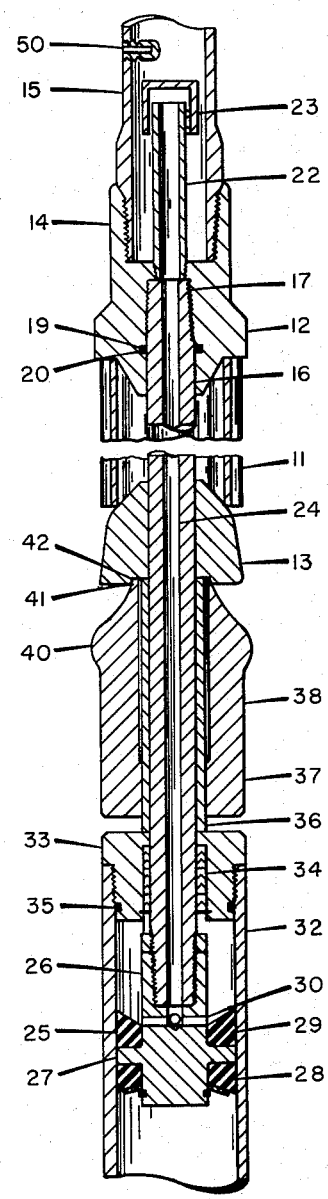
FIGURE 1 is a view in cross-section of a preferred form of the apparatus for setting a liner in casing.

In FIGURE 1, the corrugated liner tube 11 is mounted between connector 12 and an expanded cone 13. The connector 12 includes a top collar portion 14 which is internally threaded to receive standard well tubing 15 which serves to lower the entire liner setting assembly into the well. Other hollow conduit, such as drill pipe can, of course, be used, if desired. The main body portion of connector 12 includes a central passage 16, the upper portion of which is threaded to receive and hold the top of a polished rod 17. A complete seal between the polished rod and connector 12 is assured by use of O-ring 19 in peripheral groove 20 around passage 16. In the top of passage 16 a short pipe 22 with loose cap 23 is provided to prevent scale, dirt, and the like from the inside wall of the tubing from falling into the hydraulic system below.

Polished rod 17 includes a central bore 24 which connects with the interior of pipe 22. A piston 25 is mounted on the bottom of polished rod 17. The piston includes an internally threaded cap 26 for attachment to the externally threaded bottom portion of polished rod 17. The piston also includes flange 27 on which resilient cups 28 and 29 are mounted. Above top cup 29, a passage 30 is provided in the piston which is connected to the inner bore 24 of polished rod 17.

Piston 25 works in a cylinder 32 having a cap 33 through which polished rod 17 passes. Packing 34 is provided to form a seal between polished rod 17 and cap 33. Preferably, an O-ring 35 is provided between the cylinder 32 and cap 33 to insure a good seal between these members. Sleeve 36 rests on the top of cap 33 and supports expanding cone 13. Surrounding sleeve 36 is collet head 37 with collet spring arms 38. The arms have an inner surface which is spaced from sleeve 37 to permit inward movement of the arms. The arms also have slots 39 (FIGURE 2) between them to permit this same action. Near the tops of arms 38 are outwardly enlarged portions 40 which perform the final forming action to force the corrugated liner into a substantially cylindrical shape as the cone and collet head are pulled through the corrugated liner tube by the hydraulic piston and cylinder arrangement shown. Arms 40 are normally sprung out farther than shown in FIGURE 1. In this figure, the arms are shown as being restrained by projecting portions 41 which fit into a mating recess 42 in expanding cone 13. This permits lowering the assembly more easily through the well to the desired location.

Figure 2:
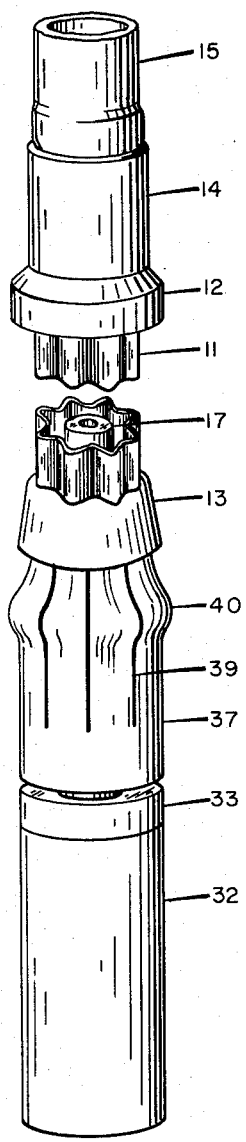
FIGURE 2 is an isometric view, partly in section, to show the form of the corrugated liner and the preferred form of head for expanding the liner.

In FIGURE 2, an exterior view, partly in section, is presented to show more clearly the form of the corrugated liner tube and the spring arms of the collet head.

Figure 3:
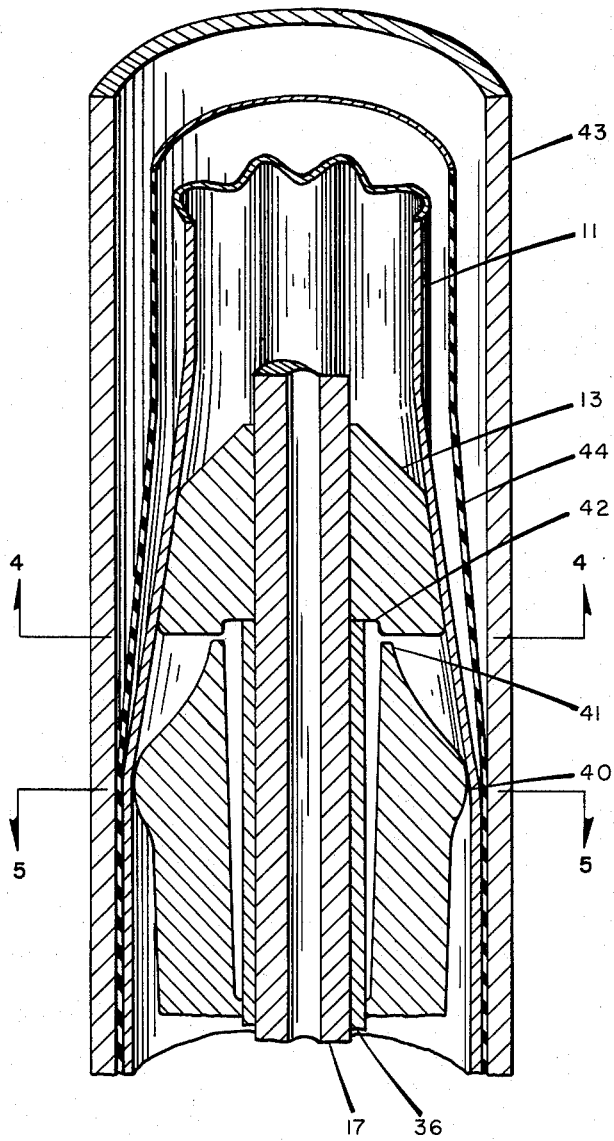
FIGURE 3 is another view in section of a portion of the apparatus of FIGURE 1 in the process of expanding a corrugated liner against the inside surface of a casing.

FIGURE 3 shows a section of the corrugated liner tube as it is being expanded inside casing 43. In this case, the tube 11 is shown covered by a sealing layer 44 made up of glass fibers saturated with a liquid resin capable of being set to a hardened state. In FIGURE 3, projections 41 are shown withdrawn from recess 42 so the arms have sprung out into the positions shown. The expanding cone and collet head have been forced partway through the liner tube 11, expanding the liner into a substantially cylindrical form inside the casing with the glass fibers and resin forming a seal between the casing and liner.

Figure 4:
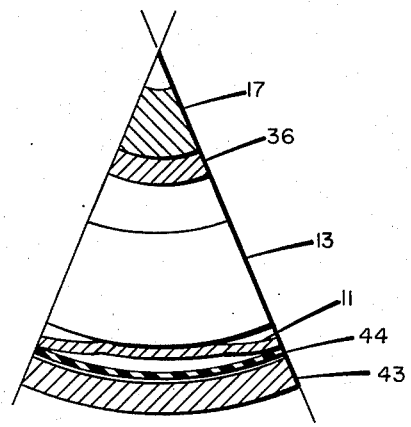
FIGURE 4 shows a portion of a section of FIGURE 3 along line 4—4.

In operation, the liner setting tool is assembled at the surface, as shown in FIGURES 1 and 2, and glass cloth saturated with resin is wrapped around the corrugated tube. The assembly is lowered into the well in this condition to the location at which the liner is to be set. A liquid, such as oil, is then pumped into the tubing. The oil passes through the well tubing, pipe 22, polished rod 17, passages 30 and into the cylinder 32 above piston 25. As the pressure increases, the pressure on cap 33 causes it to rise, carrying sleeve 36 and expander head 13 upwardly with respect to the polished rod. Upward movement of liner tube 11 is restrained by connector 12 attached to the top of the polished rod. Therefore, as expanding cone 13 rises, it expands corrugated liner tube 11. At a level near the bottom of cone 13, the liner has been expanded to the form shown in FIGURE 4.

Figure 5:
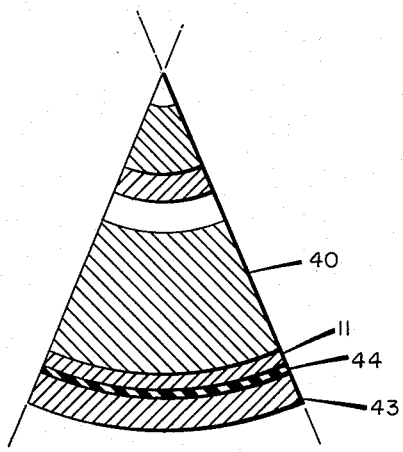
FIGURE 5 shows a portion of a section of FIGURE 3 along line 5—5.

As cone 13 passes upwardly through liner tube 11, the bottom of the tube eventually strikes the enlarged portions 40 of the collet head spring arms. When this happens, upward motion of the collet head is restrained and causes projections 41 to pull out of restraining recess 42. The arms then spring outwardly, as shown in FIGURE 3. As cap 33 on the hydraulic cylinder continues to rise, the cap comes in contact with the bottom of collet head 37, forcing it through liner tube 11. The spring arms complete the expansion of the liner tube out against the inner surface of the casing, as shown in FIGURE 5, except of course, for the sealing layer of glass fibers and resin between the liner and casing.

When the upward movement of cap 33, collet head 37, and expanding cone 13 causes cone 13 to come into contact with connector 12, the upward motion must, of course, stop. This is indicated by an increase of pressure required to inject liquid into the tubing. The expanding cone 13 and collet head 37 may then be forced the remaining distance through the corrugated liner tube by simply lifting on the well tubing. This is possible because the frictional drag of the expanded portion of the liner against the casing is sufficient to hold the liner down against the upward pull of the cone and collet head. It has been determined, for example, that the liner will resist a pull 12,000 pounds per inch of length of ⅛ inch thick liner set in 5½ inch casing. The upward force required to pull the expanding cone and collet head through the ⅛ inch thick liner in the 5½ inch casing varied from about 15,000 to about 60,000 pounds, depending upon weight of casing, heavier casing being smaller in internal diameter. It will be apparent that after only a few inches of the liner have been expanded against the casing, connecteor 12 is no longer needed to hold the liner down while the tube is being expanded.

An alternative procedure when cone 13 strikes connector 12 is to release the pressure on the tubing, raise the well tubing two or three feet, secure it firmly at the surface, and then resume injecting hydraulic fluid into the tubing. Raising the well tubing will lift connector 12 two or three feet above the top of the liner. Expanding cone 13 and collet head 37 can then be forced on through the liner tube by injecting hydraulic fluid through the tubing.

As soon as the cone and collet head have been pulled completely through the liner, the tubing and liner setting assembly are removed from the well. To avoid pulling a wet string, it is possible to include a break-off relief seal 50 in the well tubing 15 above cap 23. This seal can be broken off by dropping a go-devil down the tubing. Breaking of the seal allows the liquid in the tubing to leak out as the tubing is pulled from the well.

Figure 6:
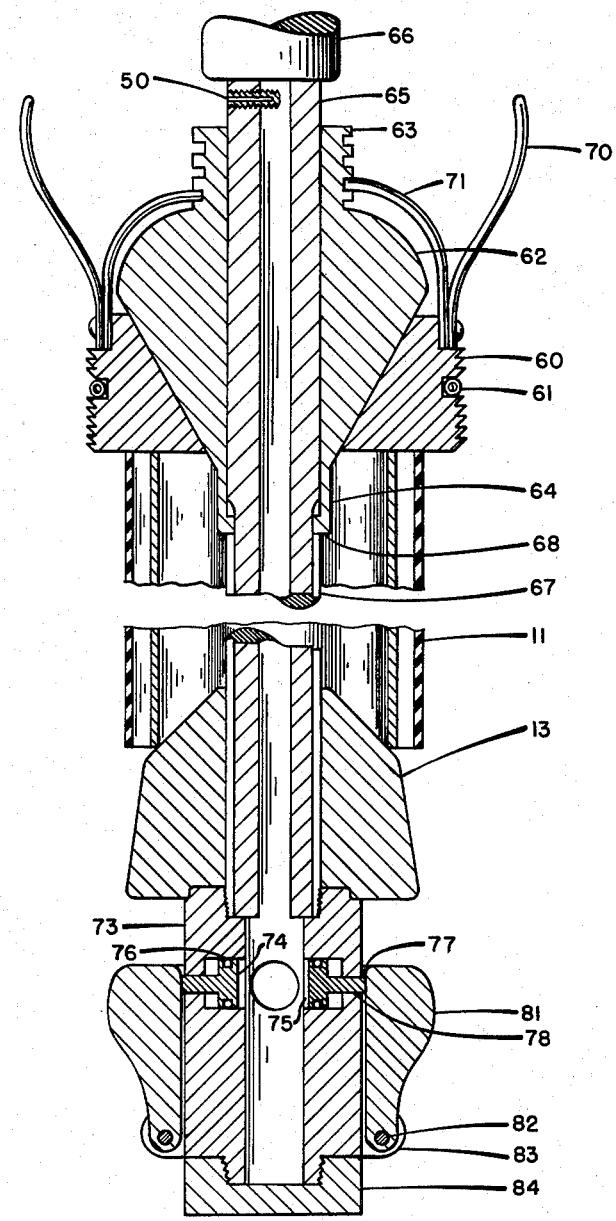
FIGURE 6 is a view in cross-section of another form of apparatus capable of expanding a corrugated liner into contact with the inside surface of a casing.

The apparatus shown in FIGURES 1 and 2 relies upon the action of hydraulic pressure to force an expanding cone and collet spring head through a corrugated liner tube to expand this tube into a substantially circular shape inside the casing. This apparatus is preferred because of its simplicity and ease of manipulation. It will be apparent, however, that other apparatus can be used to expand the corrugated liner tube. Another apparatus is shown in FIGURE 6. In this apparatus the corrugated liner tube 11 and the expanding cone 13 are the same as in FIGURE 1, but the remaining equipment is different.

In the apparatus shown in FIGURE 6, the corrugated tube 11 is restrained against upward movement by slips 60 which are mounted to slide on the outside surface of slips cone 62. A helical spring 61 in a groove in the outer surface of slips 60 holds the slips in a normally retracted position. On the top of cone 62 is a cylinder 63 having external threads. On the bottom of cone 62 is another cylinder or collar 64.

The cone 62 slides upon a hollow conduit 65, which is attached through collar 66 to well tubing or drill pipe on which the assembly is lowered into the well. The bottom portion of conduit 65 carries external grooves 67 in which slide keys 68, which are attached to the inner surface of collar 64. These keys cause cone 62 to turn with conduit 65. Slips 60 are restrained from turning by drag arms 70 which contact the well casing. Thus, when the apparatus is in a well and conduit 65 is turned, cone 62 turns with respect to slips 60. This causes the ends of spring arms 71 to move in the threads of cylinder 63 to move the slips up or down on the outer surface of cone 62.

On the bottom of conduit 65 is mounted a thick-walled, hollow body 73. In the walls of this body are mounted radially acting pistons 74 which operate in cylinders 75. A sliding seal is provided between the pistons and cylinder by packing, such as O-ring 76. A stem or rod 77 on piston 74 extends through a passage 78 in the outer wall of body 73. The outer end of rod 77 contacts arm 81, which is pivoted on pin 82, which is attached to body 73 through mounting bracket 83. The bottom of conduit 65 is closed by cap 84.

In operation, the apparatus is assembled at the surface, a wrapping of resin-saturated glass fabric is applied to the corrugated tube, and the assembly is lowered into the well on well tubing to the level at which the liner is to be set. The tubing is then rotated to the right. This causes cone 62 to rotate with respect to slips 60, drag arms 70 restraining rotation of the slips. The relative rotation of the cone and slips causes the ends of spring arms 71 to move upward in the threads of cylinder 63 on the top of cone 62, raising slips 60 with respect to cone 62. The upward movement of slips 60 with respect to cone 62 results in the outward movement of the slips until they come in contact with the casing. Lifting of the tubing now causes the corrugated liner tube 11 to push firmly against the slips and set them more firmly against the casing wall.

Continued upward pull on the tubing forces the expanding cone 13 into the liner 11 until arms 81 come in contact with the liner. At or before this time hydraulic pressure is applied through the tubing and conduit 65 to the pistons 74. The amount of hydraulic pressure can be carefully controlled to provide the desired amount of force on arms 81 to insure proper forming of the corrugated liner tube into a cylindrical shape without applying a force sufficient to damage the casing.

The expanding cone 13 and arms 81 can be forced through the liner tube by continued upward pull on the tubing until expanding cone 13 comes in contact with collar 64 on cone 62. Further upward movement of the tubing and expanding cone 13 then moves slips cone 62 upwardly with respect to slips 60, thus releasing the slips. Thereupon spring 61 collapses the slips and allows them to move upwardly with the rest of the assembly. Corrugated tube 11, at this point, no longer requires the holding action of the slips. As explained previously, the frictional drag of only a few inches length of the liner set inside the casing is enough to hold the tube in place while the expanding cone 11 and arms 81 are pulled through the top portion of this corrugated liner tube.

As soon as the expanding cone 11 and arms 81 clear the top of the liner tube, the assembly can be simply withdrawn from the well. Preferably, break-off release seal 50 is provided and is broken by dropping a go-devil to permit any liquid to drain from the tubing and thus avoid pulling a wet string. This also avoids any hydraulic head of liquid in the tubing from acting on pistons 74 to force arms 81 outwardly against the casing wall as the assembly is raised up the well.

Figure 7:
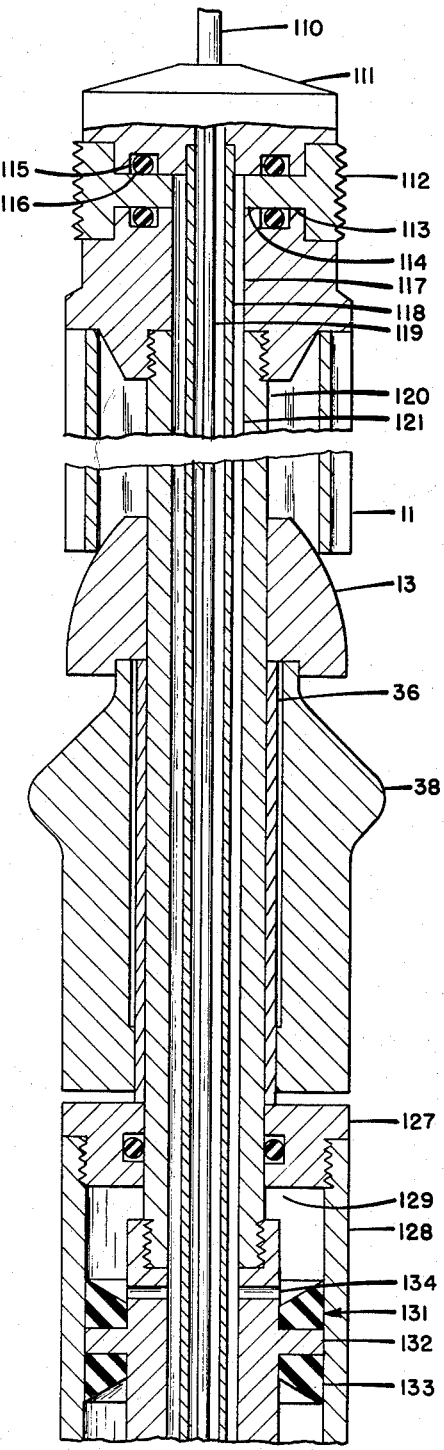
FIGURE 7 is a view partly in cross-section of the upper portion of apparatus in which an electric motor drives a pump to operate the liner expanding apparatus.
Figure 8:
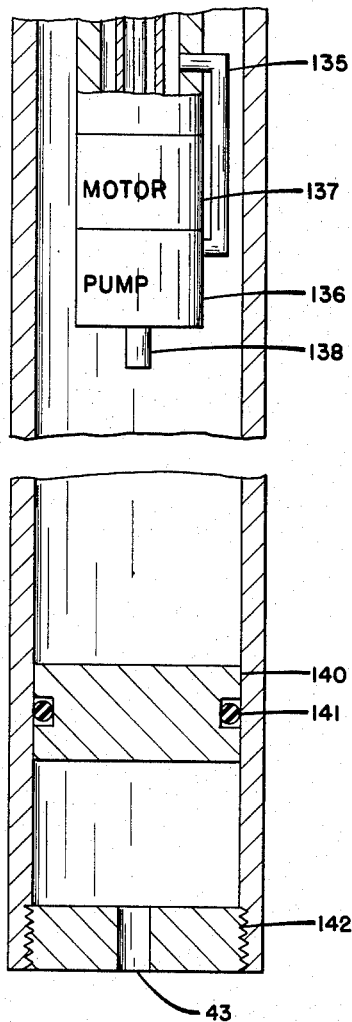
FIGURE 8 is a view in cross-section of the lower part of apparatus, the top of which is shown in FIGURE 7.

In FIGURES 7 and 8 armored electric cable 110 supports the apparatus through a head 111 which contains hydraulically actuated slips 112. Each slips member includes a piston portion 113 operating in cylinder 114 formed in head 111. O-ring grooves 115 surrounding cylinders 114 receive O-rings 116 which form a seal around piston portions 113. The ends of piston portions 113 are exposed to central bore 117 in head 111 so that hydraulic pressure can be applied through bore 117 to piston portions 113 to force the slips outwardly. Central bore 117 also receives conduit 118 through which electrical conductors 119 pass to a motor. To the bottom of head 111 polished rod 120 is attached. This polished rod also has a central passage 121 aligned with bore 117 to receive conduit 118 leaving sufficient space outside the conduit to permit passage of hydraulic fluid to pistons 113. Surrounding the upper portion of rod 120 is corrugated liner tube 11. The upper end of the liner tube rests against head 111 while the bottom of the tube is supported by solid expanding cone 13. In the bottom of cone 13 is an annular groove which receives the upper ends of sleeve 36 and spring arms 38. The bottom of sleeve 36 is supported by cap 127 of hydraulic cylinder 128. On the bottom of polished rod 120 a piston 131 is mounted. This piston includes a flange member 132 and resilient cups 133. Above the resilient cups, passages 134 connect the interior of the hollow polished rod to the space above the piston in cylinder 128. Below the resilient cups, hydraulic liquid reaches the interior of the hollow polished rod through a tube 135 from pump 136. Pump 136 is driven by reversible motor 137 which receives electric power through leads 119. The pump takes liquid through intake tube 138 from the space below the piston in cylinder 128. Below the motor and pump in cylinder 128 a floating piston 140 with an O-ring seal 141 is provided. The bottom of the cylinder is closed by plug 142 except for an opening 143 through the plug.

In operation the apparatus is assembled at the top of a well and a fiberglass mat is wrapped around the corrugated liner and saturated with resin as described in more detail in connection with FIGURE 1. The assembly is then lowered into the well on the electric cable to the level at which the liner is to be set. The motor is then actuated to cause the pump to force liquid from the space below piston 131 into the space above this piston. Floating piston 140 compensates for differences in the volumes of the polished rod in cylinder 128 above piston 131 as this piston moves in the cylinder, or more accurately, as the cylinder moves upwardly with respect to the stationary piston. As the pressure increases, solid cone 13 and spring arms 38 are forced into corrugated liner 11 to expand the liner.

As soon as cone 13 strikes the bottom of head 111, the pressure in the hydraulic system rises sharply. This increases the load on the motor. The increased load is indicated by an increased flow of current. This serves as a signal at the surface that the electric power to the motor should be interrupted. Preferably, the increased current simply actuates an overload switch to break the circuit automatically. The rotation of the motor is then reversed. At the same time, a mild pull is placed on cable 110. When the motor is reversed, the pump also reverses, releasing the pressure within hollow rod 120 and permitting piston 131 to move upwardly with respect to cylinder 128. This also means that rod 120 and head 111 are moved upwardly with respect to the partially expanded liner 11 and expanding cone 13. Head 111 is moved upwardly a distance sufficient to permit spring arms 38 to pass the upper edge of liner 11 before cone 13 again contacts head 111. The direction of rotation of the motor is then again reversed applying pressure to the interior of rod 120. The result is that slips 112 are set against the casing to hold the upper portion of the apparatus while the action of the hydraulic pressure in cylinder 128 forces the expanding head on up through the liner to complete the expansion of the liner. As soon as the enlarged portions on spring arms 38 pass the top edge of the liner, the apparatus is free to be removed from the well by lifting on cable 110.

FIGURES 9 and 10 represent the top and bottom portions, respectively, of another form of electric motor operated apparatus. In FIGURE 9 electric cable 110 supports apparatus which is acutated by electric motors through reduction gears and jack screws. In this case motor 151 acts through gear reduction 152 such as a planetary gear to turn jack screws 153. This draws base 154 upwardly forcing sleeve 36, expanding cone 13, and spring arms 38 through corrugated tube 11 as previously described. When cone 13 comes in contact with guide 155, the motor stalls and is automatically shut off as explained in connection with FIGURES 7 and 8. The motor is then reversed while lifting on cable 110 until guide 155 has been lifted a foot or so above cone 13 so that spring arms 38 can be forced on through the liner. Motor 156 is then operated to actuate reduction gear 157 and turn jack screw 158. This draws slips cones 159 down, forcing slips segments 160 out against the casing. Keys 161 acting in slots 162 prevent the slips segments from turning with respect to the housing of reduction gear 157, while keys 163 operating in slots 164 in turn prevent rotation of cone 159 with the jack screw. When the slips are firmly set, the motor stalls, throwing an automatic overload switch in the circuit at the top of the well. Motor 151 is then actuated in the direction to pull cone 13 and spring arms 38 through the remaining unexpended portion of corrugated liner tube 11. The liner setting apparatus can then be lifted from the well by means of the electric cable 110. Thus, it is seen that the liner can be set by purely mechanical means independent of a hydraulic system.

Figure 11:
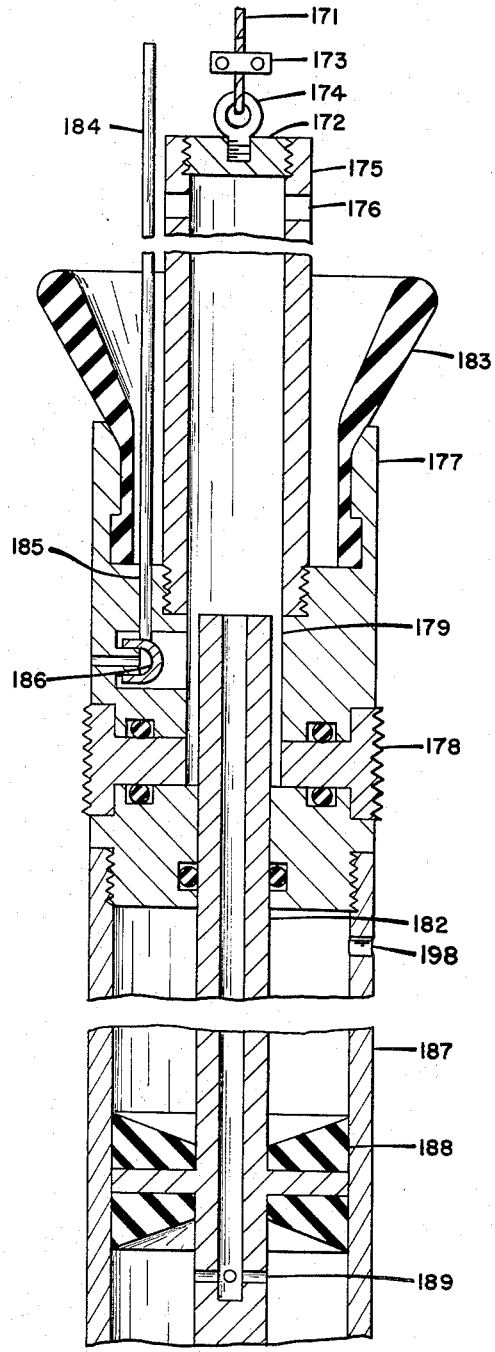
FIGURE 11 is a view in cross-section of the upper portion of an apparatus which can be lowered on an uninsulated wire line to the desired level in a well, the liner then being set by hydraulic pressure applied through the casing.
Figure 12:
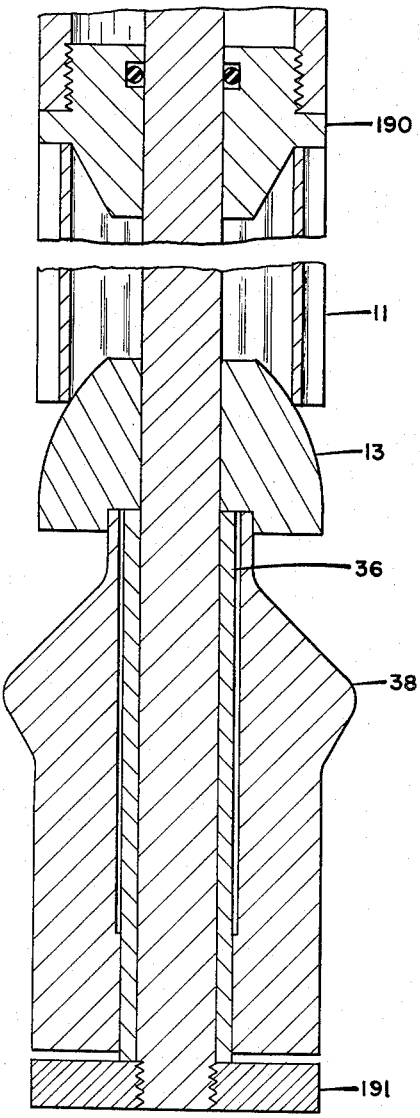
FIGURE 12 is a view in cross-section of the lower part of the apparatus of FIGURE 11.

In FIGURES 11 and 12 uninsulated wire line or steel cable 171 is attached to the top 172 of the liner setting apparatus by means of clamp 173 and ring 174. Top 172 is screwed into the top of a long tube 175 having ports 176 near the top. This tube is in turn attached to slips housing 177. Slips 178 are of the hydraulically actuated type. The bases of slips 178 are exposed to annular space 179 between the housing and polished rod 182. The upper part of slips housing 177 also serves as the mounting base for a cup-type packer 183. The upper end of rod 184 extends above the top of tube 175 and the bottom of the rod extends through opening 185 in housing 177 and rests on break off relief seal 186.

The bottom of slips housing 177 serves as the top of a hydraulic cylinder 187 which has an opening 198 through the wall near the top. Cylinder 187 carries piston 188. Polished rod 182 is hollow to a point below piston 188 and openings 189 extend between the hollow interior of the rod and the space below piston 188 in cylinder 187. Polished rod 182 continues on downwardly through bottom cap 190 of cylinder 187. Rod 182 extends on through corrugated liner 11, expanding cone 13, sleeve 36, and spring arms 38 to base plate 191.

In operation the apparatus of FIGURES 11 and 12 is lowered into the well on line 171 after a resin impregnated glass fiber mat is attached to the outer surface of liner tube 11. When the apparatus is at the desired level in the well, hydraulic pressure is applied to the casing. This is preferably done by introducing several gallons of liquid, for example a mineral oil, into the well and then applying pressure to this oil by means of a compressed gas. The oil enters the top of packer 183 pressing this packer against the casing wall. The oil also enters ports 176 in tube 175 filling the interior of this tube. Oil passes down the hollow center of rod 182 and enters the portion of cylinder 187 below piston 188. When pressure is applied to this oil by means of a compressed gas in the casing, a tight seal is formed between packer 183 and the casing wall. The pressure acts on the bases of slips 178 to set the slips firmly against the casing. Hydraulic pressure acting on the bottom of piston 188 pulls base plate 191 upwardly, forcing cone 13 and spring arms 38 into liner 11 until cone 13 contacts cap 190. The pressure in the casing is then released. This releases slips 178 and permits the upper portion of the apparatus to be lifted by line 171 a distance sufficient to permit spring arms 38 to be pulled on through the liner before cone 13 again strikes cap 190. Reapplication of pressure to the casing then resets slips 178 and pulls spring arms 38 the remaining distance through the liner. As soon as spring arms 38 are clear of the liner, the casing pressure is released to release slips 178 and packer 183 after which the apparatus is lifted from the well on line 171. To prevent swabbing the casing with packer 183, a go-devil (not shown) can be dropped to strike rod 184 which breaks seal 186 and allows the oil on top of the packer to drain out below the packer, thus further facilitating lifting of the apparatus from the well.

Figure 13:
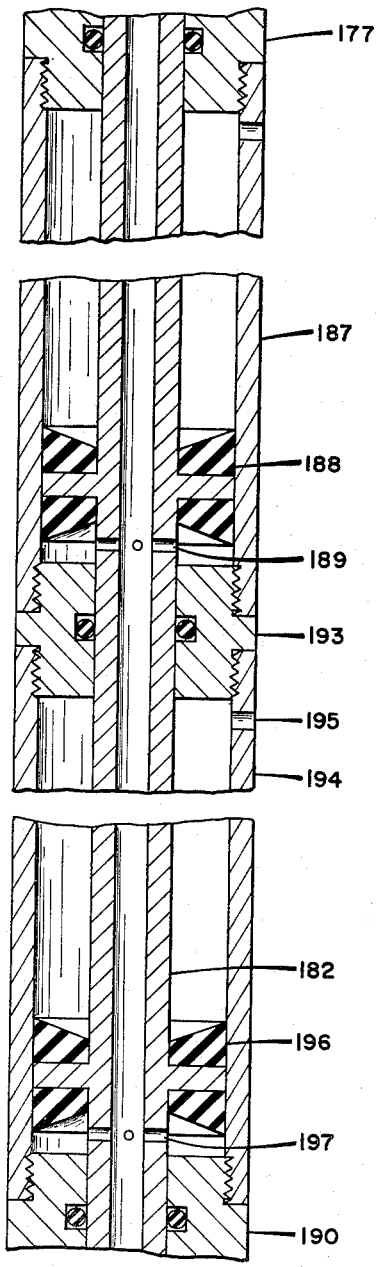
FIGURE 13 shows apparatus employing multiple pistons in tandem to obtain a greater force with low hydraulic pressures.

It will be apparent that it is possible to expand the corrugated liner tube out against the casing by many means in addition to those shown in the figures. Still other modifications will be apparent to those skilled in the art. For example, in the apparatus of FIGURES 11 and 12, the pressure which can be employed may be limited by the strength of casing weakened by corrosion. In this case the apparatus shown in FIGURE 13 may be used. In this apparatus piston 188 and cylinder 187 below slips housing 177 is the same as in FIGURE 12. Between this assembly and bottom cap 190, however, an intermediate connector 193 is provided in the apparatus of FIGURE 13. Below this connector is a second cylinder 194 with a port 195. Piston 196 operates in cylinder 194. Ports 197 connect the interior of hollow rod 182 with the space below piston 196 in cylinder 194. Thus, when pressure is applied to the liquid inside the hollow polished rod, this pressure acts on the lower surfaces of both pistons 188 and 196, providing the same lifting force as in the apparatus of FIGURES 11 and 12 with only one-half the pressure in the casing. This same modification can be used in the apparatus of FIGURES 1 and 2, 7 and 8, or in any other system employing hydraulic pressure to actuate a piston. In the apparatus of FIGURE 7, for example, a second cylinder and piston arrangement can be provided above piston 131 and cylinder 128, the opening to the hollow interior of the rod being placed above the piston and the port being placed through the wall of the second cylinder below the piston near the bottom of the cylinder.

Still other modifications or combinations of the various types of apparatus may also be desirable. For example, it is sometimes found desirable to use a hydraulic slips mechanism as shown in FIGURES 7 and 11 with the apparatus shown in FIGURES 1 and 2. Such hydraulic slips are also shown on page 5232 of the 1960–61 edition of the Composite Catalog of Oil Field Equipment and Services. The advantage of such an arrangement in the apparatus of FIGURE 1 is that a short piston and cylinder can be used with a long corrugated liner section. After each short piston stroke, the pressure is released and the tubing is raised. The hydraulic slips are set and another piston stroke is then achieved by applying pressure again to the tubing. The tubing can, of course, be held at the top of the well, but this allows considerable stretch in the tubing in a deep well. Sometimes it is also desirable not to place too much load on well tubing, particularly if the tubing has seen considerable use.

Still other apparatus and methods will occur to those skilled in the art for performing the specific step of reforming the corrugated liner tube into substantially cylindrical shape against the inner surface of the casing. The principal requirement is simply to expand the corrugated liner tube out against the inner surface of the casing, reform it into substantially cylindrical form, and leave it in a state of substantially maximum compression. Although a few comments regarding this action were included in the description of the operation of the apparatus shown in FIGURE 1, a more complete explanation of the principles involved is probably advisable.

The action depends upon the design of the corrugated liner tube. In its corrugated form the maximum cross-sectional dimension must be less than the internal diameter of the casing so the liner can be run into the casing. After reforming into cylindrical form within the casing, the liner is to be left in substantially maximum compressive hoop stress. This means that the external cross-sectional periphery of the corrugated tube must be larger than the internal cross-sectional circumference of the casing so the final forming operation will place the liner in compression. The expression "expanding" the liner into contact with the casing may be misleading. The expanding cone does expand the liner in the sense that it forces the outer ridges of the corrugations outwardly until they come in contact with the casing. Then the inner corrugations are, in a sense, expanded radially outward toward the casing. It will be apparent, however, that the only way the inner ridges of the corrugated liner can move outwardly, if the outer ridges have contacted the casing, is by compressing the wall of the liner. When the inner ridges of the corrugations are still a considerable distance from the casing, a rather large radial force may be required to compress the liner wall and cause radial movement outwardly toward the casing wall. After the liner reaches the position shown in FIGURE 4, however, a small radial pressure near the middle of the remaining arch causes a very large force in a direction circumferentially around the liner. The reasons are the same as those which cause a large force along the walls of any flat arch when a small load is placed on the top of the arch. As a result, once the expanding cone has formed the liner into the shape shown in FIGURE 4, the spring arms 38 in FIGURE 1, or the hydraulically driven arms 81 in FIGURE 6, need to exert only a small radial force to complete the forming of the liner into a substantially cylindrical shape inside the casing.

Equipment such as that shown in FIGURE 1 was designed principally to set a liner in 5½-inch casing of 15½-pound weight. This equipment was also used successfully to set liners in 15 and 17-pound casing of 5½-inch size. A few data on use of the design in the 5½-inch, 15½-pound casing are of interest. In all these cases, the liner was formed from 5-inch diameter seamless mild steel tubing with a wall thickness of ⅛ inch. This tubing was vertically, that is, longitudinally corrugated by drawing it through a die to form eight corrugations having an average bending radius of about ⅜ inch. The maximum cross-sectional diameter of the corrugated tube was about 4½ inches. In forming the corrugations, the metal was stretched at the outer ridges and compressed at the inner valleys to produce an external cross-sectional perimeter about 2 percent longer than the original external circumference of the tubing.

The glass cloth was what is known as woven roving and was saturated with epoxy resin containing a polyamide catalyst to make the resin set after the liner was expanded in the casing. In the final lined casing, the layer of glass fibers and plastic was found to average about 0.025 inch in thickness. The collet head was divided into eight spring arms, a little less than 2 inches wide. The radial forces of the spring arms and the forces required to pull the expanding cone and collet head through the corrugated tube are shown in Table 1.

*Table 1*

| Weight of 5½" Casing | Radial Spring Force, Pounds per Arm | Force to move Cone and Collet Head through a Liner, Pounds | | |
|---|---|---|---|---|
| | | Cone | Collet Head | Total |
| 14 | | 7,600 | 2,400 | 10,000 |
| 15 | 1,700 | 10,500 | 4,000 | 14,500 |
| 15½ | 2,750 | 15,800 | 6,700 | 22,500 |
| 17 | 5,200 | 22,300 | 10,200 | 32,500 |

The radial spring forces were determined by measuring the inside diameter of the liner set in each weight of pipe and then reading off the appropriate force figure on the calibration curve of the spring. If the liner had been reformed into a completely cylindrical form in the 14-pound casing, the internal diameter of the liner would have been greater than the completely expanded diameter of the collet spring arms. Actually, the liner was not completely reformed into a cylindrical shape in the 14-pound casing so the spring arm force approached but did not reach 0 pounds.

In the case of the force required to pull the expanding cone and collet spring head through the liner in the various weights of casing, these were separately determined and then simply added to obtain the total figure. The actual total force necessary to pull both the expanding cone and collet spring head through the liner simultaneously was generally somewhat higher than the figure shown in Table 1. In the case of one liner set in a 17-pound casing, for example, the interior surface of the liner was not well lubricated so the expanding cone and collet head moved through the liner in jumps. The total force in this case sometimes approached 60,000 pounds. This total force was determined by multiplying the hydraulic pressure in the cylinder by ten since the area of the hydraulic piston was 10 square inches. Since tensile forces of 75,000 pounds are sometimes imposed on two-inch well tubing in other well operations, it will be apparent that this tubing could be used to pull the expanding cone and collet spring head through the liner used in this work in a 17-pound 5½-inch casing even with a poorly lubricated liner. It will also be apparent, however, that if the liner is to be expanded in 20-pound, 5½-inch casing, some changes should be made. For example, a weaker spring may be used in the collet head, a liner either slightly smaller in circumference or slightly thinner may be employed, a better lubricant may be applied to the inside of the liner, or a stronger conduit such as 3-inch tubing, or drill pipe may be used.

It will be apparent that some limitations should be observed. The principal limitations concern the corrugated liner tube and the casing in which it is to be set. A brief comparison of the circumference of the liner, after being set in the casing, to the perimeter of the corrugated liner before setting, shows clearly that the yield strength of the liners was exceeded so that in most of the reforming operation the liner material was in plastic flow. This means that after the liner was reformed into a cylindrical shape inside the casing, the liner was in maximum compressive stress. The casing must be, of course, in sufficient tensile stress to hold the liner in maximum compressive stress. It will be obvious then that if the liner and casing are of the same metal, the liner must be thinner than the casing or the maximum tensile strength of the casing will be exceeded and it will burst.

Actually, the casing should be considerably thicker than the liner. This is because after the collet head arms have reformed the liner into substantially cylindrical shape, these arms continue to exert the radial force shown in Table 1. Thus, the casing must withstand not only the stress imposed by the liner, but also the stress imposed by the spring arms of the collet head. Ordinarily, the stress resulting from the spring arms is much less than that resulting from the liner. The principal reason is that the force of the collet spring is applied to only a very short section of casing, so the casing on each side of the collet head helps to oppose this force. In order to have some margin of safety, however, it is generally advisable to use a steel liner which is not more than about one-half as thick as the steel casing in which it is set.

Of course, there are many types of steel used in wells and the liner can be made either of steel or of several other types of metals or alloys, such as aluminum, aluminum alloys, brass, or the like, to meet special requirements, such as corrosion resistance. The more general limitation can be stated therefore, that the maximum compressive strength of the material of which the liner is made times the wall thickness of the liner must be less than the maximum tensile strength of the material of which the casing is made times the wall thickness of the casing. This limitation includes the extreme case where the stress imposed by the collet head arms is so small that it can be ignored. Generally, a liner wall thickness of only about one-half the indicated value should be used to allow for a margin of safety.

The liner should be annealed after forming into the corrugated shape in order to reconvert the metal into a more malleable form. Otherwise, the work hardening which results from the corrugating operation may cause the liner to crack when reformed into cylindrical shape. If steel is used as a liner material, the radius of bending at the corrugation ridges and valleys should be at least about three times the thickness of the metal to avoid cracking the steel when the corrugations are made. Preferably, the bending radius should be such that the corrugations are formed of arcs of circles.

The number of corrugations is controlled principally by the limitation on bending radius. Thus, if the liner wall thickness is ⅛ inch, the bending radius is about three times the thickness and the depth of corrugations is about six times the thickness, the distance between ridges of the corrugations will be about 1½ inches. A distance of about 2 inches is preferred for this liner thickness in order to avoid the danger of cracking the liner during the corrugating and setting operation. Using this approximate 2 inch spacing between corrugations, the numbers of corrugations for liners of 3, 4½ and 6 inches in maximum cross-sectional dimension are 5, 7, and 9, respectively. It is generally simpler to use even numbers of corrugations and collet head spring so the numbers should preferably be 6, 8, and 10 for the 3, 4½ and 6-inch liners. These dimensions were selected since they are approximately correct for the 4, 5½ and 7-inch casing respectively.

In order to leave the liner in maximum compressive stress within the casing, it is necessary that the external cross-sectional perimeter of the liner be greater than the internal circumference of the casing. The amount by which the liner wall must be compressed to insure that the liner tube reaches maximum compression is usually less than about ¼ of 1 percent. When a liner of glass fibers and plastic is provided between the liner and the casing, and if the perimeter of the corrugated liner is any greater than the internal circumference of the casing, this requirement is satisfied. The upper limit on amount by which the corrugated liner perimeter exceeds the internal circumference of the casing is controlled principally by the force required to drive the expanding cone and collet head through the liner. If the corrugated liner perimeter is more than about 10 percent greater than the internal casing circumference, the work required to reform the liner into cylindrical shape inside the casing will be great. The force required to move the expanding heads through the liner at a desirable rate will be correspondingly great. Therefore, the corrugated liner external perimeter should ordinarily not exceed the casing internal circumference by more than about 10 percent. In the case of the liner set in the 17-pound, 5½-inch casing in Table 1, the perimeter of the liner was about 4 percent greater than the internal circumference of the casing.

While the ridges and valleys of the corrugations are preferably parallel to the axis of the liner tube, it will be apparent that a tube in which the corrugations spiral around the tube to some degree may also be used. Preferably, however, the tube should be substantially longitudinally corrugated. That is, a ridge of the corrugations should not vary more than about an inch or two from a line parallel to the axis of the tube in a foot-long section of the tube.

The radial force exerted by the spring arm of the collet head should lie within certain limits. As shown in Table 1, however, satisfactory results can be obtained when these limits are rather wide. The force should be at least about 1,000 pounds for an arm about 2 inches wide in order to insure a good reforming action on the corrugated liner. Preferably, the force should not be greatly in excess of about 5,000 pounds, principally to decrease the drag of the arms as they are forced through the liner. As previously noted, there are several ways to overcome this problem so even greater radial forces are often permissible. Ordinarily, however, they are not required. The same range of radial forces applies, of course, to the hydraulically-driven arms shown in FIGURE 6. In general, the radial force may be said to be sufficiently great to expand the corrugated tube into substantially cylindrical shape without imposing a tensile stress in the casing in excess of the maximum tensile strength of the material of which the casing is made.

The glass fibers which are applied outside the liner and are saturated with liquid resin can be of several types. In selecting an appropriate type, the principal functions of the glass fibers should be borne in mind. The main function is to carry sufficient resin to fill irregularities between the casing and liner and to fill holes through the casing, forming a button outside of the casing wherever possible. External pressure applied to such a button forms a pressure-actuated seal. The glass fibers must also form barriers to prevent excessive flow of the resin from between the liner and casing until the resin has set to a hardened state. To do this, the glass fibers must withstand the full radial pressure applied by the liner against the casing. It must withstand this pressure permanently, with the aid of the hardened resin, since it is the existence of this pressure which prevents leakage between the liner and the casing.

The glass fibers best adapted to these purposes are obtained in the form of cloth, woven of threads which are, in turn, spun from very fine glass fibers, preferably less than 0.001 inch in diameter. Mats in which the threads are stuck together with an adhesive or plastic may also be used. The glass mats may be simply wrapped around the outside of the corrugated liner and held in place by bands, threads, or wires. Preferably, the glass mat is glued to the corrugated surface of the liner. In this case, the resin may be applied with a blade or wire brush after the glass mat is glued to the liner surface. If the mat is simply wrapped around the liner, the resin is most conveniently applied to the glass mat, again with a blade or wire brush, before the mat is wrapped around the liner. In any case, the glass mat should be thoroughly saturated with the resin.

Any resin which will cure or set hard, either naturally or artificially, in the well may be employed. Typically, these resins are thermosetting resins, i.e., resins which are capable of undergoing a permanent physical change under the influence of well temperature or an artificially induced higher temperature. Polyester or epoxy resins are examples. Other suitable resins include urea, resorcinol and phenol formaldehyde, and the like. Epon 828, an epoxy resin manufactured by Shell Chemical Company, is an example of a preferred epoxy resin. As is well known in this art, these resins may be combined and various catalysts or curing agents employed in various concentrations so that the setting or curing time or pot life for various well depths or various temperatures may be controlled. Versamid resin 140, a polyamide manufactured by General Mills, Inc., is an example of a preferred catalyst which, in the ratio of about 30 parts by volume to 70 parts of the Epon 828 epoxy resin, has a pot lift at room temperature of about 3 to 3½ hours. Such resins when set, i.e., when they are cured sufficiently to be self-supporting and relatively rigid, are referred to herein as plastics.

As previously noted, a lubricant should be applied to the inside surface of the corrugated liner tube to decrease frictional drag on the expanding cone and collet head. Use of such a lubricant is not essential, but is recommended. The lubricant may be mineral oil, vegetable oil such as cottonseed oil, or animal oil such as sperm oil. It may also be in a more solid form, such as paraffin wax, beeswax, tallow, or the like. A preferred lubricant is made up to about 90 percent ozokerite, or its purified form ceresin wax, and about 10 percent of finely divided particles of malleable material, such as copper, lead, graphite, nutshells, or the like.

The principal application of the apparatus and method is to patching holes in casing in wells. These may take the form of small holes, large holes, parted casing, splits, or the like. The apparatus and method are also applicable to casing which has no holes. Thus, the patch may be applied to a badly corroded section of casing before any actual holes appear. It may also be applied inside relatively uncorroded casing to strengthen the casing against external pressure, for example. In a broad sense, a well casing is one embodiment of a pressure vessel. Thus, the patch should be considered applicable to other vessels, particularly those subjected to external pressure such as underwater storage tanks, or the like. Still other applications will occur to those skilled in the art.

When a patch is set in casing, it frequently extends across a weak, perforated or split section of casing and the ends are set inside of better sections of the casing. It is in these end sections of casing that the principal seal is generally made. Therefore, the limits stated above as to the strength and thickness of the casing are intended to apply to the stronger portions in which the ends of the patch are set rather than the weak or split portion opposite the center of the patch.

When a patch is to be set across the gap in parted casing, for example, the coating of glass fibers and resin can, at least theoretically, be omitted from the center section opposite the gap in the casing. Actually, however, it is usually important to have the coating of glass fibers and resin extend over the entire length of the corrugated tube. The principal reason is to provide corrosion resistance. The resin-saturated glass fiber mat protects the liner from corrosive fluids outside the casing. In addition, in setting a patch in a deep well, it is difficult to place it exactly where desired. Therefore, at least a portion of an uncoated section of the liner might be placed opposite the casing itself rather than opposite the gap in the casing. It has also been noted that the resin tends to form a fillet against the ends of the parted casing. This fillet usually forms a pressure-actuated seal against the casing ends and aids in preventing entrance of fluids between the casing and liner. For all these reasons it is considered important that the coating of glass fibers and resin extend over the entire outside surface of the corrugated tube.

In the embodiment of my invention in which the liner is sealed in the bottom of a casing string and extends into the previously unlined portion of the well, the glass fibers and resin should also be used around the portion of the liner opposite the open hole. The principal reason is to form a good seal between the liner and the formation. In order that the same diameter of liner can be used opposite both the casing and the open hole, the well below the casing should be drilled or reamed to a diameter within a quarter of an inch or so of the internal diameter of the casing. In a new well this is no problem. In an old well it is customary to clean out the bottom of a well before setting a liner. During this operation a bit or reamer should be run to insure an open hole diameter below the casing nearly as large as the internal casing diameter. The liner can then be set in the open hole as well as in the bottom of the casing by the same method as if the entire liner was being set in casing.

In order to leave as small a section of unlined well as possible at the bottom of the well, the hydraulic cylinder may be placed above the liner rather than below it. Such a design is shown, for example, in my copending U.S. patent application Serial Number 179,609, filed March 14, 1962. This same copending application also shows by way of example a design for a different type of expanding head which can be used if desired. The corrugated tube can also be expanded by simply mounting the expanding head on the bottom of drill pipe and forcing it downwardly through the liner. This operation is possible with a bottom hole liner since the bottom of the well supports the liner. The operation is also described in more detail in my copending U.S. application 179,609.

In some cases it may be desirable to hang a liner such as a perforated liner or sand screen below the casing, no seal to the formation being required. In this case it is necessary to corrugate and subsequently expand only the top portion of the liner into contact with the casing. In this case the expanding head shown in FIGURE 1 is mounted in the portion of the unexpanded liner below the corrugated section, the restraining extensions on the top of the spring arm permitting this operation to be performed easily. The corrugated tube with the uncorrugated portion below it is then lowered into the well and expanded into contact with the lower portion of the casing exactly as if the uncorrugated portion was not attached. It is also possible to force an expanding head downwardly through the corrugated portion as explained above, the expanding head being forced only through the corrugated portion, however. Still other specific techniques and applications will be apparent to those skilled in the art.

In the foregoing description, many specific materials are mentioned. For example, glass fibers or glass fabric is suggested. It will be apparent that other materials which are physically equivalent to those named should be considered to be within the scope of my invention. For example, some types of strong rock wool fibers should be considered the equivalents of glass fibers if their physical properties are substantially the same as those of glass fibers.

Division U.S. application 384,017 entitled "Apparatus for Forming Metallic Casing Liner" and divisional U.S. application 384,018 entitled "Corrugated Tube for Lining Wells" were filed on June 25, 1964.

I claim:

1. A method for setting a metallic liner inside a substantially cylindrical metallic vessel comprising mounting a malleable metallic longitudinally corrugated tube on a means for inserting said tube into said vessel, said tube having an external cross-sectional perimeter greater than the internal cross-sectional circumference of said vessel, the thickness of the wall of said tube times the maximum compressive strength of the metal of which said tube is made being less than the thickness of the wall of said vessel times the maximum tensile strength of the metal of which said vessel is made, applying around said tube a layer of glass fibers, saturating said layer with a liquid resin which can be set to a hardened state, inserting into said vessel said tube with its surrounding layer of resin-saturated glass fibers, applying inside said tube a force sufficient to reform said metallic longitudinally corrugated tube into substantially cylindrical form but insufficient to impose in the wall of said vessel a tensile stress in excess of the maximum tensile strength of the material of which said vessel is made while said resin is in a liquid state, curing said resin to a hardened state, and withdrawing from the vessel said means for inserting said tube into said vessel, whereby a metallic liner is placed in compression within said vessel and said resin forms a seal between said liner and said vessel.

2. A method for setting a steel liner in a steel casing in a well comprising mounting a longitudinally corrugated tube of malleable steel on a hollow conduit for lowering the tube into a well, said malleable steel having a maximum compressive strength substantially the same as the maximum tensile strength of said casing, the external cross-sectional perimeter of said tube being greater than the internal circumference of said casing, and the wall thickness of said tube being less than the wall thickness of said casing, applying a glass fiber mat around said tube, saturating said mat with a liquid resin capable of being set to a hardened state, lowering into said casing said tube together with its resin-saturated glass fiber mat, applying inside said tube a force sufficient to reform said metallic longitudinally corrugated tube into substantially cylindrical form but insufficient to impose in the wall of said casing a tensile stress in excess of the maximum tensile strength while said resin is in a liquid state, curing said resin to a hardened state, and withdrawing said hollow conduit from said well, whereby a metallic liner is placed in compression within said casing and said resin forms a seal between said liner and said casing.

3. A method for patching a hole in casing in a well comprising mounting a longitudinally corrugated tube of malleable metal on a hollow conduit for lowering said tube into the well, said tube being larger than the hole to be patched, said tube having an external cross-sectional perimeter greater than the internal cross-sectional circumference of said casing, and the thickness of the wall of said tube times the maximum compressive strength of the metal of which said tube is made being less than the thickness of said casing times the maximum tensile strength of the metal of which said casing is made, applying around said tube a glass fiber mat, saturating said mat with a liquid resin which can be set to a hardened state, lowering into said casing said tube with its resin-saturated glass fiber mat, placing said tube opposite said hole in said casing, applying inside said tube a force sufficient to reform said metallic longitudinally corrugated tube into substantially cylindrical form but insufficient to impose in the wall of said casing a tensile stress in excess of the maximum tensile strength while said resin is in a liquid state, curing said resin to a hardened state, and withdrawing said hollow conduit from said well, whereby a metallic cyilndrical patch is placed in compression within said casing, and said resin is partly extruded into said hole and hardened to form a seal against flow of fluids between said tube and the wall of said vessel.

4. A method for setting a metallic liner inside a substantially cylindrical metallic vessel comprising mounting a malleable metallic longitudinally corrugated tube on a means for inserting said tube into said vessel, said tube having an external cross-sectional perimeter greater than the internal cross-sectional circumference of said vessel, the thickness of the wall of said tube times the maximum compressive strength of the metal of which said tube is made being less than the thickness of the wall of said vessel times the maximum tensile strength of the metal of which said vessel is made, applying around said tube a layer of glass fibers, saturating said layer with a liquid resin which can be set to a hardened state, inserting into said vessel said tube with its surrounding layer of resin-saturated glass fibers, forcing through said tube a head including arms exerting an outward force on said tube sufficient to expand said tube into substantially cylindrical shape but insufficient to impose in the wall of said vessel a tensile stress in excess of the maximum tensile strength of the material of which said vessel is made, said head being forced through said tube while said resin is in a liquid state, curing said resin to a hardened state, and withdrawing from the vessel said means for inserting said tube into said vessel, whereby a metallic liner is placed in compression within said vessel and said resin forms a seal between said liner and said vessel.

5. A method for setting a steel liner in a steel casing in a well comprising mounting a longitudinally corrugated tube of malleable steel on a hollow conduit for lowering the tube into a well, said malleable steel having a maximum compressive strength substantially the same as the maximum tensile strength of said casing, the external cross-sectional perimeter of said tube being greater than the internal circumference of said casing, and the wall thickness of said tube being less than the wall thickness of said casing, applying a glass fiber mat around said tube, saturating said mat with a liquid resin capable of being set to a hardened state, lowering into said casing said tube together with its resin-saturated glass fiber mat, forcing through said tube a head including arms exerting an outward force on said tube sufficient to expand it into substantially cylindrical shape but insufficient to impose in the wall of said casing a tensile stress in excess of the maximum tensile strength, said head being forced through said tube while said resin is in a liquid state, curing said resin to a hardened state, and withdrawing said hollow conduit from said well, whereby a metallic liner is placed in compression within said casing and said resin forms a seal between said liner and said casing.

6. A method for patching a hole in casing in a well comprising mounting a longitudinally corrugated tube of malleable metal on a hollow conduit for lowering said tube into the well, said tube being larger than the hole to be patched, said tube having an external cross-sectional perimeter greater than the internal cross-sectional circumference of said casing, and the thickness of the wall of said tube times the maximum compressive strength of the metal of which said tube is made being less than the thickness of said casing times the maximum tensile strength of the metal of which said casing is made, applying around said tube a glass fiber mat, saturating said mat with a liquid resin which can be set to a hardened state, lowering into said casing said tube with its resin-saturated glass fiber mat, placing said tube opposite said hole in said casing, forcing through said tube a head including arms exerting an outward force on said tube sufficient to expand it into substantially cylindrical shape, but insufficient to impose in the wall of said casing a tensile stress in excess of the maximum tensile strength, said head being forced through said tube while said resin is in a liquid state, curing said resin to a hardened state, and withdrawing said hollow conduit from said well, whereby a metallic cylindrical patch is placed in compression within said casing, and said resin is partly extruded into said hole and hardened to form a seal against flow of fluids between said tube and the wall of said vessel.

References Cited by the Examiner
UNITED STATES PATENTS

| | | | |
|---|---|---|---|
| 1,301,285 | 4/19 | Leonard | 166—206 |
| 1,880,218 | 10/32 | Simmons | 166—206 |
| 1,981,525 | 11/34 | Price | 166—207 |
| 2,214,226 | 9/40 | English | 166—207 |
| 2,583,316 | 1/52 | Bannister | 166—46 |
| 2,762,436 | 9/56 | Brown | 166—46 |
| 2,884,066 | 4/59 | Teplitz et al. | 166—55 |
| 2,937,665 | 5/60 | Kennedy | 138—145 |
| 2,966,173 | 12/60 | Matherne et al. | 138—145 |
| 3,028,915 | 4/62 | Jennings | 166—46 |
| 3,039,530 | 6/62 | Condra | 166—55 |

BENJAMIN HERSH, *Primary Examiner.*

CHARLES E. O'CONNELL, *Examiner.*